United States Patent [19]
Yuasa et al.

[11] Patent Number: 4,740,449
[45] Date of Patent: Apr. 26, 1988

[54] OPTICAL RECORDING MEDIUM

[75] Inventors: Satoshi Yuasa, Yokohama; Masahiro Haruta, Tokyo; Yoko Yoshinaga, Machida; Hirohide Munakata, Yokohama; Kenji Saito, Tokyo; Yukuo Nishimura, Sagamihara, all of Japan

[73] Assignee: Canon Kabushiki Kaisha, Tokyo, Japan

[21] Appl. No.: 854,542

[22] Filed: Apr. 22, 1986

[30] Foreign Application Priority Data

Apr. 25, 1985 [JP] Japan ................................. 60-87641

[51] Int. Cl.⁴ ........................... G03C 1/00; G03C 1/72
[52] U.S. Cl. .................................... 430/270; 430/290; 430/495; 430/945
[58] Field of Search ................ 430/495, 270, 21, 290

[56] References Cited

U.S. PATENT DOCUMENTS 3,215,529 11/1965 Lindquist et al. .................. 430/290
4,216,287 8/1980 Sano et al. .......................... 430/270

Primary Examiner—Paul R. Michl
Assistant Examiner—Mark R. Buscher
Attorney, Agent, or Firm—Fitzpatrick, Cella, Harper & Scinto

[57] ABSTRACT

An optical recording medium is provided which comprises an optical recording layer provided on a support, said optical recording layer containing a compound modifiable under light irradiation and gelled polymer.

8 Claims, No Drawings

OPTICAL RECORDING MEDIUM

BACKGROUND OF THE INVENTION

1. Field of the Invention

The present invention relates to a novel optical recording medium comprising an optical recording layer containing gelled polymer swollen by a solvent.

2. Related Background Art

Gels made from crosslinked polymer are classified into two groups; hydro-gel containing water as a liquid component, and organo-gel containing an organic solvent. Structural stability of gel is known to vary depending upon the structure of the crosslinked polymer itself and the intermolecular force between the crosslinked polymer and the liquid component. It has been also known that a gelled polymer swollen by a solvent exhibits phase separation by reversible phase transition depending on the surrounding conditions such as temperature, the composition of the solvent, pH, electric field, etc. Although the gelled polymer is subtransparent when swollen by a solvent, the gel polymer is deprived of the solvent by phase transition, and finally it reaches shrunk state through a white turbid stage.

Making use of phase transition of the gelled polymer, gels have been studied for new applications including various kinds of recording media, display device, switch element, transport medium for solvent, etc.

However, a gelled polymer which responds to light irradiation and which, as a result, undergoes phase transition had not been known.

SUMMARY OF THE INVENTION

The inventors had studied comprehensively to use a gelled polymer for a photosensitive optical recording medium. As a result, it was found that the gelled polymer undergoes phase transition under light irradiation when a compound is used which is modified by light irradiation, e.g. a compound which changes to another compound having a new functional group under light irradiation, or a complex which is dissociated under optical irradiation. This is because activity of a substance formed from modification of the compound causes phase transition (formation of white turbidity) of a gelled polymer. It was found that the fact mentioned above could be applied to many kinds of recording elements, etc.

The object of the present invention is to propose a new optical recording medium made of gelled polymer.

The object mentioned above is attained by the present invention described below.

According to an aspect of the present invention, there is provided optical recording medium, comprising an optical recording layer provided on a support, said optical recording layer containing a compound modifiable under light irradiation and a gelled polymer.

DETAILED DESCRIPTION OF THE PREFERRED EMBODIMENTS

An optical recording medium of the present invention basically comprises a support and an optical recording layer laminated thereon which contains gel polymer. In addition, other forms of media are possible: for example, a protective layer, etc. can be put on an optical recording layer containing a gelled polymer.

A support works to reinforce an optical recording medium physically, and it can take various shapes (flat sheet, cylinder, etc.). Any transparent or opaque material including metal, inorganic oxide, plastics, wood, paper, cloth, etc. may be employed as the material.

An optical recording layer containing a gelled polymer basically constituted of an organic polymer which composes a gel base, solvent which makes a substrate swell, and a compound which is modifiable under light irradiation.

The organic polymer composing a gel base of gelled polymer may be any kind of organic polymer as long as it is three-dimensionaly crosslinked and it becomes swollen by solvent to form so-called "gel". The applied organic polymer is required to respond to a dissociation product formed from complex dissociated by light and to cause phase transition easily. Such organic base polymers include those obtained from polymerization of one or more vinyl type monomers as a main component having a polar group as a substituent such as acrylamide, methacrylamide, hydroxyethyl methacrylate, acrylic acid, methacrylic acid, diethyl aminomethacrylate, and with a multifunctional monomer as a crosslinking component, e.g. divinylbenzene, methylene-bis-acrylamide, etc. or those obtained from reaction of a linear polar polymer such as polyacrylamide, polyethylene oxide, etc. and a crosslinking agent such as cyanuric chloride, glutaraldehyde, etc.

Either water or an organic solvent may be employed as a solvent which makes organic polymer swell to gel. Especially, water and a mixed solvent composed of water and a water soluble solvent such as methanol, ethanol, acetone, methyl ethyl ketone, ethylene glycol, glycerine, dimethylformamide, dimethylacetamide, tetrahydrofuran, dioxane, etc. are preferable.

Although the quantity of the solvent relative to the organic base polymer is not particularly restricted, it is advisable to use as much solvent as possible in order to make clear changes on physical properties based on phase transition, especially white turbid state of the swollen gel.

In a compound modified under light irradiation which is used for an optical recording medium of the present invention, there should be considerable difference in the wavelengths or in light intensity between writing light (causing modification) and reading light (irradiated to an optical recording medium at the time of reading).

As long as the above requirements are satisfied, various kinds of compounds are appliable. Typical two groups of examples are;

1. compounds which give new functional groups under light irradiation
2. complexes which dissociate under light irradiation.

As the compounds which produce new functional groups under optical irradiation (No.1), any compounds which produce hydroxyl group, carboxyl group, or amino group, etc. are favorably used. For example, aldehydes including o-nitrobenzaldehyde and o-nitrosobenzaldehyde, aromatic or aliphatic carboxylic esters including, phenol acetate, phenol propionate, catechol acetate, catechol propionate, salicylic acid acetate, salicyclic acid propinate, acetanilide, propionic anilide, N-(o-hydroxy-phenyl)acetamide, azoxybenzenes and so on are used.

In the case of o-nitrobenzaldehyde, it is modified nitrosobenzoic acid under light irradiation as expressed by the following reaction formula. Therefore, when an organic compound, possessing functional group such as amino group which produces mutual activity with carboxyl group is used for base gel, phase transition occurs in gelled polymer under light irradiation.

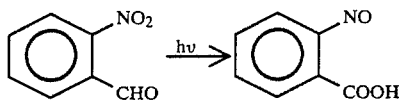

As the compounds (No.2) which dissociate under light irradiation, compounds which are acidic or basic when being dissociated are applicable. For example, complex such as hexamine cobalt (III) complex, trisoxalato-iron complex, triphenylmethane coloring matter such as 4,4'-bis-(dimethylamino)-triphenylmethane leuco hydroxide which produces hydroxy ion under light irradiation are used.

In the case of hexamine cobalt (III) complex, it dissociates under light irradiation as shown in the following reaction formula.

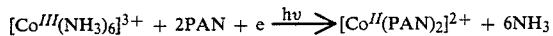

(PAN: 1-(2-pyridylazo)-2-naphthol)

Therefore, when an organic macromolecule possessing weak acid group such as carboxyl group is used for a base gel, phase transition occurs in the gelled polymer under light irradiation.

Although the content of a compound modified under light irradiation which is used for an optical recording medium of the present invention is varied depending upon the kind of organic compound composing base gel for an optical recording medium and application of an medium, it is recommended to use a compound at 0.2-10 wt % against an organic base polymer.

Since a substance produced by dissociation of the compound under light irradiation should cause phase transition (formation of white turbidity) in the gelled polymer only at the parts corresponding to optically irradiated spots, a substance which can move freely in a layer containing a compound is unfavorable. Therefore, a higher viscosity of the solvent in the gel is preferred so far as it does not retard unpractically the rate of the phase transition. In addition, small thickness of an optical recording layer containing gel polymer thin is favorable, and the optimum layer thickness is 1–1000 μm.

An optical recording medium of the present invention is more preferred to be laminated further with a translucent protective layer on an optical recording layer containing gelled polymer. The protective polymer prevents the solvent in gelled polymer from evaporating, and it is produced from material such as plastics and glass. Shape and sensitivity of an optical recording medium can be kept stable by keeping the content of the solvent in the gelled polymer at a constant value.

An optical recording medium of the present invention employs a gelled polymer as a photosensitive medium, which can be used for many kinds of new recording elements, display devices, switch elements, optical modulation elements, etc.

An optical recording medium of the present invention is explained by examples below. The present invention, however, is not restricted to the following cases.

EXAMPLE 1

After 3.2 g of N,N-diethylacrylamide and 32 mg of N,N-methylene-bis-acrylamide were dissolved in 48 ml of water, 30 mg of ammonium persulfate was added and the solution was deaerated by vacuum using an aspirator. After tetramethylethylenediamine was further added thereto, the solution was supplied between two sheets (20 mm×35 mm) of Teflon (trade name) were held with a gap of recording 35 μm by a spacer of Mylar (trade name) to prepare gel by polymerization.

After freeze-drying, the gel was made swollen in 0.002% o-nitrobenzaldehyde solution in water. The swollen gel was then put between glass sheets (20 mm ×35 mm in size, 0.3 mm in thickness) and epoxy resin was used to seal the periphery. Thus, an optical medium was finally prepared.

When the medium, on which a photomask with the fixed pattern was put, was irradiated by light at wave length of 366 nm from a mercury lamp, the irradiated portion of the gel became turbid in white, and thereby, the fixed pattern was successfully written on the gel. Since a beam of the incident light reflects irregularly at the white turbid parts, written pattern could be read by detection of transmitted light or scattered light.

EXAMPLE 2

After 2.7 g of N,N-diethylacrylamide, 0.3 g of acrylic acid and 32 mg of N,N-methylenebisacrylamide were dissolved in 48 ml of water, 30 mg of ammonium persulfate was added and the solution was deaerated by vacuum using an aspirator. After tetramethylethylenediamine was also added to the solution, it was supplied between two Teflon sheets (20 mm×35 mm) which were supported at 35 μm interval by Mylar spacer to make gel by polymerization.

After being freeze-dried, the gel was made swollen in 30% methanol solution containing $4\times10^{-4}$ mol of chlorohexaammine cobalt (III), $2\times10^{-4}$ mol of 1-(2-pyridylazo)-2-naphthol. The swollen gel was further put between two glass sheets (20 mm×35 mm in size, 0.3 mm in thickness) and epoxy resin was used to seal the periphery. Thus, an optical recording medium was finally prepared.

When the medium, on which a photomask with the fixed pattern was put, was irradiated by visible light from a halogen lamp, the irradiated portion of the gel becomes turbid in white, and thereby the fixed pattern is successfully written in on the gel. Since a beam of an incident light reflects irregularly at the white turbid parts, a written pattern could be read by either detection of transmitted light or scattered light.

EXAMPLE 3

After 5 g of acrylamide, 0.2 g of methacrylamidopropyltrimethylammonium chloride and 0.14 g of N,N-methylene-bis-acrylamide were dissolved in 100 ml of water, 30 mg of ammonium persulfate was added to the solution. The solution was then deaerated by vacuum using an aspirator.

After 100 μl of tetramethylethylenediamine was further added to the solution, it was immediately supplied between two Teflon sheets (20 mm×35 mm) which were supported with a gap of 35 μm by Mylar spacer, and polymerization was effected to give gel.

The gel was sufficiently washed with methanol and then dried.

Then, the dried gel mentioned above was made swollen in 50% acetone solution which contained $4\times10^{-4}$ mol of 4,4'-bis(dimethylamino) triphenylmethane hydroxide and $2\times10^{-2}$ mol of chlorocetyltrimethylammonium and pH of which had been adjusted to 5 by sodium hydroxide.

The swollen gel was put between two glass sheets (20 mm×35 mm in size, 0.3 mm in thickness) and epoxy resin was used to seal the periphery. Thus, an optical recording medium was finally prepared.

When the medium, on which a photomask with the fixed pattern was put, was irradiated by light at wave length of 366 nm from a high pressure mercury lamp, the irradiated portion of the gel became turbid in white, and thereby, the fixed pattern was successfully written on the gel.

Since a beam of the incident light reflects irregularly at the white turbid parts, the written pattern could be read either from detection of transmitted light or scattered light.

We claim:

1. An optical recording medium, comprising an optical recording layer provided on a support, said optical recording layer containing a compound modifiable under light irradiation and a gelled polymer, said gelled polymer being capable of undergoing phase transition caused by modification of said compound.

2. An optical recording medium according to claim 1, wherein a transparent protective layer is provided on the optical recording layer.

3. An optical recording medium according to claim 1, wherein the gelled polymer becomes turbid in white when the compound is modified.

4. An optical recording medium according to claim 1, wherein the compound is dissociated under light irradiation.

5. An optical recording medium according to claim 1, wherein the compound produces a new functional group under light irradiation, said new functional group being capable of causing the gelled polymer to undergo phase transition.

6. An optical recording medium according to claim 1, wherein the compound is contained in an amount of 0.2-10% by weight based on the weight of the polymer.

7. An optical recording medium according to claim 1 wherein the optical recording layer has a thickness ranging from 1 $\mu$m to 1000 $\mu$m.

8. An optical recording medium according to claim 1, wherein said gelled polymer becomes turbid as a result of phase transition of said gelled polymer.

* * * * *

UNITED STATES PATENT AND TRADEMARK OFFICE
CERTIFICATE OF CORRECTION

PATENT NO. : 4,740,449
DATED : April 26, 1988
INVENTOR(S) : SATOSHI YUASA, ET AL.

It is certified that error appears in the above-identified patent and that said Letters Patent is hereby corrected as shown below:

<u>COLUMN 2</u>

Line 61, "salicyclic" should read --salicylic--.

<u>COLUMN 3</u>

Line 45, "gel polymer thin" should read --a thin gel polymer--.

<u>COLUMN 4</u>

Line 35, "rohexaammine" should read --rohexamine--.

<u>COLUMN 6</u>

Line 18, "claim 1" should read --claim 1,--.

Signed and Sealed this

Thirteenth Day of September, 1988

Attest:

DONALD J. QUIGG

Attesting Officer     Commissioner of Patents and Trademarks